(12) United States Patent
Chun et al.

(10) Patent No.: US 8,634,312 B2
(45) Date of Patent: Jan. 21, 2014

(54) EFFECTIVE DATA BLOCK TRANSMISSION METHOD USING HEADER INDICATOR

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 101 days.

(21) Appl. No.: 12/678,487

(22) PCT Filed: Sep. 18, 2008

(86) PCT No.: PCT/KR2008/005497
§ 371 (c)(1),
(2), (4) Date: Mar. 16, 2010

(87) PCT Pub. No.: WO2009/038347
PCT Pub. Date: Mar. 26, 2009

(65) Prior Publication Data
US 2010/0208749 A1    Aug. 19, 2010

Related U.S. Application Data

(60) Provisional application No. 60/973,442, filed on Sep. 18, 2007, provisional application No. 60/982,710, filed on Oct. 25, 2007.

(30) Foreign Application Priority Data

Sep. 17, 2008    (KR) .................. 10-2008-0091287

(51) Int. Cl.
*H04L 12/58*    (2006.01)
(52) U.S. Cl.
USPC .......................... 370/252; 370/255; 370/389

(58) Field of Classification Search
USPC ......... 370/252, 255, 310, 328, 338, 349, 389, 370/471, 474
See application file for complete search history.

(56) References Cited

U.S. PATENT DOCUMENTS 6,445,917 B1    9/2002    Bark et al.
6,594,240 B1    7/2003    Chuah et al.
(Continued)

FOREIGN PATENT DOCUMENTS

CN    1314747    9/2001
CN    1339903    3/2002
(Continued)

OTHER PUBLICATIONS

LG Electronics Inc. "Correction of status report coding", 3GPP TSG RAN WG2 #61, Feb. 11-15, 2008, Sorrento, Italy, XP-002624626, R2-080969.

(Continued)

*Primary Examiner* — Ian N Moore
*Assistant Examiner* — Mon Cheri Davenport
(74) *Attorney, Agent, or Firm* — McKenna Long & Aldridge LLP

(57)    ABSTRACT

Disclosed is a radio (wireless) communication system providing a radio communication service and a terminal, and more particularly, to a method of exchanging a data block or data unit between a base station and a terminal in an Evolved Universal Mobile Telecommunications System (E-UMTS) that has evolved from a Universal Mobile Telecommunications System (UMTS) or a Long Term Evolution (LTE) system, which can generate a data block to enhance efficiency of radio resources.

5 Claims, 4 Drawing Sheets

(56) References Cited

U.S. PATENT DOCUMENTS

| | | |
|---|---|---|
| 6,594,244 B1 | 7/2003 | Chang et al. |
| 6,628,946 B1 | 9/2003 | Wiberg et al. |
| 6,728,918 B1 | 4/2004 | Ikeda |
| 6,788,944 B2 | 9/2004 | Jiang |
| 6,862,450 B2 | 3/2005 | Mikola et al. |
| 7,171,163 B2 | 1/2007 | Terry et al. |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 8,270,348 B2 | 9/2012 | Chun et al. |
| 2002/0001314 A1 | 1/2002 | Yi et al. |
| 2002/0024972 A1* | 2/2002 | Yi et al. ............ 370/470 |
| 2002/0114280 A1 | 8/2002 | Yi et al. |
| 2002/0122411 A1 | 9/2002 | Zimmerman et al. |
| 2003/0099305 A1 | 5/2003 | Yi et al. |
| 2004/0008659 A1 | 1/2004 | Kim |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0083943 A1 | 4/2005 | Lee et al. |
| 2005/0100048 A1 | 5/2005 | Chun et al. |
| 2005/0105499 A1 | 5/2005 | Shinozaki et al. |
| 2005/0118992 A1 | 6/2005 | Jeong |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0249141 A1 | 11/2005 | Lee et al. |
| 2005/0254467 A1 | 11/2005 | Li et al. |
| 2005/0286483 A1 | 12/2005 | Lee et al. |
| 2006/0007886 A1 | 1/2006 | Lee et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067364 A1 | 3/2006 | Jung et al. |
| 2006/0072503 A1 | 4/2006 | Kim et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth |
| 2006/0165045 A1* | 7/2006 | Kim et al. ............ 370/349 |
| 2006/0182065 A1 | 8/2006 | Petrovic et al. |
| 2006/0203780 A1 | 9/2006 | Terry |
| 2006/0233200 A1 | 10/2006 | Fifield |
| 2006/0251105 A1 | 11/2006 | Kim et al. |
| 2006/0264179 A1 | 11/2006 | Bonneville et al. |
| 2006/0274690 A1 | 12/2006 | Chun et al. |
| 2006/0281456 A1 | 12/2006 | Roberts et al. |
| 2007/0041397 A1 | 2/2007 | Hwang |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0177628 A1 | 8/2007 | Choi et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0223526 A1 | 9/2007 | Jiang |
| 2007/0258591 A1 | 11/2007 | Terry et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0002688 A1 | 1/2008 | Kim et al. |
| 2008/0008152 A1 | 1/2008 | Lohr et al. |
| 2008/0043658 A1 | 2/2008 | Worrall |
| 2008/0043670 A1 | 2/2008 | Marinier |
| 2008/0045224 A1 | 2/2008 | Lu et al. |
| 2008/0045272 A1 | 2/2008 | Wang et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1* | 3/2008 | Yi et al. ............ 370/394 |
| 2008/0081598 A1 | 4/2008 | Chandra et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |
| 2008/0232396 A1 | 9/2008 | Buckley et al. |
| 2008/0233940 A1 | 9/2008 | Jen |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2008/0310395 A1 | 12/2008 | Kashima |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046667 A1 | 2/2009 | Pelletier et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0119564 A1 | 5/2009 | Sagfors et al. |
| 2009/0156194 A1 | 6/2009 | Meylan |
| 2009/0175163 A1 | 7/2009 | Sammour et al. |
| 2009/0175253 A1 | 7/2009 | Wu et al. |

(56) References Cited

U.S. PATENT DOCUMENTS

| | | |
|---|---|---|
| 2009/0190480 A1 | 7/2009 | Sammour et al. |
| 2009/0232076 A1 | 9/2009 | Kuo |
| 2009/0259908 A1* | 10/2009 | Gollapudi ............ 714/748 |
| 2009/0305712 A1 | 12/2009 | Franceschini et al. |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0142457 A1 | 6/2010 | Chun et al. |
| 2010/0157904 A1 | 6/2010 | Ho et al. |
| 2010/0232335 A1 | 9/2010 | Lee et al. |
| 2010/0260140 A1 | 10/2010 | Zhu |
| 2011/0019604 A1 | 1/2011 | Chun et al. |
| 2011/0033048 A1* | 2/2011 | Stanwood et al. ............ 380/255 |
| 2011/0149865 A1 | 6/2011 | Lee et al. |

FOREIGN PATENT DOCUMENTS

| | | |
|---|---|---|
| CN | 1349360 | 5/2002 |
| CN | 1396780 | 2/2003 |
| CN | 1549610 | 11/2004 |
| CN | 1613210 A | 5/2005 |
| CN | 1642067 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 101047966 A | 10/2007 |
| CN | 101090281 | 12/2007 |
| EP | 1 263 160 A1 | 12/2002 |
| EP | 1326397 | 7/2003 |
| EP | 1 509 011 A2 | 2/2005 |
| EP | 1 638 237 A2 | 3/2006 |
| EP | 1695462 A1 | 8/2006 |
| EP | 1768297 | 3/2007 |
| EP | 2026523 | 2/2009 |
| EP | 2 163 006 | 3/2009 |
| EP | 2108223 | 10/2009 |
| JP | 6-053921 | 2/1994 |
| JP | 07-162948 | 6/1995 |
| JP | 2000-324161 | 11/2000 |
| JP | 2001-197021 | 7/2001 |
| JP | 2002-198895 | 7/2002 |
| JP | 2003-018050 | 1/2003 |
| JP | 2003-115796 | 4/2003 |
| JP | 2003-115876 | 4/2003 |
| JP | 2003-516021 | 5/2003 |
| JP | 2003-229925 A | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006-505209 A | 2/2006 |
| JP | 2006-51466 | 4/2006 |
| JP | 2006-121562 | 5/2006 |
| JP | 2006-311543 A | 11/2006 |
| JP | 2007-116639 | 5/2007 |
| JP | 2007-312244 | 11/2007 |
| JP | 2008-520125 | 6/2008 |
| JP | 2009-513058 A | 3/2009 |
| JP | 2009-521893 A | 6/2009 |
| JP | 2010518683 | 5/2010 |
| KR | 10-2001-0045783 | 6/2001 |
| KR | 10-2003-0060055 A | 7/2003 |
| KR | 10-2003-0087914 A | 11/2003 |
| KR | 10-2004-0034398 A | 4/2004 |
| KR | 10-2005-0103127 A | 10/2005 |
| KR | 2005-0103127 | 10/2005 |
| KR | 10-2006-004935 | 1/2006 |
| KR | 10-2006-0029452 A | 4/2006 |
| KR | 10-2006-0090191 A | 8/2006 |
| KR | 10-2007-0076374 | 7/2007 |
| KR | 10-0907978 | 7/2009 |
| KR | 2009-0084756 | 8/2009 |
| RU | 2291594 | 1/2007 |
| RU | 2291594 C2 | 1/2007 |
| RU | 2304348 | 8/2007 |
| TW | 496058 | 7/2002 |
| WO | WO 01/37473 | 5/2001 |
| WO | WO 2004/028041 A1 | 4/2004 |
| WO | WO 2004/042953 | 5/2004 |
| WO | WO2004/102838 | 11/2004 |
| WO | 2005022814 A1 | 3/2005 |
| WO | WO 2005/078967 A1 | 8/2005 |
| WO | WO 2005/079105 | 8/2005 |
| WO | WO2005/109671 | 11/2005 |
| WO | WO 2005/122441 | 12/2005 |
| WO | WO 2006/009714 | 1/2006 |
| WO | WO 2006/016785 A1 | 2/2006 |
| WO | WO 2006/033521 A1 | 3/2006 |
| WO | WO 2006/052086 | 5/2006 |
| WO | 2006075820 A1 | 7/2006 |
| WO | WO 2006/083149 | 8/2006 |
| WO | WO 2006/095385 | 9/2006 |
| WO | 2006104773 A1 | 10/2006 |
| WO | WO 2006/104335 A2 | 10/2006 |
| WO | WO 2006/104342 A2 | 10/2006 |
| WO | WO 2006/116620 | 11/2006 |
| WO | WO 2006/118418 | 11/2006 |
| WO | WO 2006/118435 | 11/2006 |
| WO | WO 2007/020070 | 2/2007 |
| WO | WO 2007/023364 | 3/2007 |
| WO | WO 2007/045505 A1 | 4/2007 |
| WO | WO 2007/052921 | 5/2007 |
| WO | WO 2007/052921 A1 | 5/2007 |
| WO | WO 2007/078155 A2 | 7/2007 |
| WO | WO 2007/078156 A2 | 7/2007 |
| WO | WO 2007/078174 | 7/2007 |
| WO | WO 2007/079085 A2 | 7/2007 |
| WO | WO 2007/091831 | 8/2007 |
| WO | WO 2007/147431 | 12/2007 |
| WO | WO 2008/004725 | 1/2008 |
| WO | WO 2008/010063 | 1/2008 |
| WO | WO 2008/094120 | 8/2008 |
| WO | WO 2009/035301 | 3/2009 |

OTHER PUBLICATIONS

3$^{rd}$ Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.

Alcatel-Lucent: "PDCP status report carrying LIS only", 3GPP TSG RAN WG2 #61, Jan. 14-18, 2008, Sevilla, Spain, XP-50138711, R2-080902.

Qualcomm Europe: "Further Details on RACH Procedure", 3GPP TSG-RAN WG1 #48, Feb. 12-16, 2007, St. Louis, Missouri, R1-070649.

NTT DoCoMo, Inc. "Buffer Status Report and Scheduling Request triggers", 3GPP TSG RAN WG2 #59, Aug. 20-24, 2007, Athens, Greece, R2-073574.

"Correction to PDCP Status Report", 3GPP TSG RAN WG2 #61bis, Mar. 24, 2008, R2-081594, XP-002624627.

Ericsson: "Scheduling Request in E-UTRAN", 3GPP TSG-RAN WG2 #47bis, Sorrento, Italy, Jan. 15-19, 2007, R1-070471.

LG Electronics Inc: "UE state transition in LTE_Active", R2-061002, 3GPP TSG-RAN WG2 #52; Mar. 27-31, 2006, Athens, Greece. XP-050130928.

Texas Instruments: "UL Synchronization Management and Maintenance in E-UTRA", R1-072198, 3GPP TSG-RAN WG1 #49, May 7-11, 2007 Kobe, Japan. XP050105936.

Texas Instruments: "UL Synchronization Management in LTE_Active", R1-071478, 3GPP TSG RAN WG1 #48 bis, Mar. 26-30, 2007, St. Julians, Malta. XP050105413.

Motorola: "Contention-free Intra-LTE Handover", R2-070730, 3GPP TSG-RAN WG2 #57, Feb. 12-16, 2007, St. Louis, Missouri. XP 050133763.

(56) References Cited

OTHER PUBLICATIONS

Ericsson: "Scheduling Request in E-Utran", R1-070471, 3GPP TSG-RAN WG2 #47bis, Jan. 15-19, 2007, Sorrento, Italy. XP50104502.
Nokia, "Uplink Scheduling for VoIP", 3GPP TSG-RAN WG2 Meeting #57, Feb. 12-16, 2007, St. Louis, Missouri. R2-070476, XP008125208.
Nokia, "Buffer Reporting for E-UTRAN", 3GPP TSG-RAN WG2 Meeting #52, Mar. 27-31, 2006, Athens, Greece. R2-060829, XP002503218.
Ericsson, Nokia Corporation, Nokia Siemens Networks, Qualcomm Europe, Samsung, NTT DoCoMo, Inc, "Framework for scheduling request and buffer status reporting", Nov. 5-9, 2007, TSG-RAN WG2 Meeting #60, R2-074691.
Motorola, "Synchronized Random Access Channel and Scheduling Request", Nov. 6-10, 2006, 3GPP TSG RAN1 #47, R1-063046.
Ericsson, "Basic principles for the scheduling request in LTE", Aug. 28-Sep. 1, 2006, 3GPP TSG RAN WG2 #54, R2-062350.
NTT DoCoMo, Fujitsu, Mitsubishi Electric, NEC, Sharp, Toshiba Corporation, "Scheduling Request Transmission Method for E-Utra Uplink" Nov. 6-10, 2006, 3GPP TSG RAN WG1 Meeting #47, R1-063301.
"Digital Cellular telecommunications system (Phase 2+); Functional stage 2 description of Location Serices (LCS) in GERAN (3GPP TS 43.059 version 7.3.0 Release 7); ETSI TS 143 059" ETSI Standards, LIS, Sophia Antipolis Cedex, France, vol. 3-G1, No. V7.3.0, XP014038519.
ZTE: "Redundant retransmission restraint in RLC-AM", 3GPP Draft; R2-061234, 3rd Generation Partnership Project, Mobile Competence Centre; vol. RAN WG2 no. Shanghai, China, May 3, 2006, XP050131180.
Reuven Cohen: "An improved SSCOP-like Scheme for Avoiding Unnecessary Retransmissions and Achieving Ideal Throughput", Proceedings of IEEE Infocom 1996, Conference on Computer Communications, Fifteenth Annual Joint Conference of the IEEE Computer and communications Societies, Mar. 24-28, 1996, pp. 855-862, XP010158150.
U.S. Appl. No. 60/976,139 (U.S. Appl. No. 12/238,810, filed Sep. 26, 2008 claims priority to this Provisional).
U.S. Appl. No. 61/019,058 (U.S. Appl. No. 12/340,033, filed Dec. 19, 2008 claims priority to this Provisional).
Kashima, Method and Apparatus for Providing Timing Alignment, U.S. Appl. No. 60/944,662 (provisional applications are not published).
Wu et al. Enhanced Random Access Response Formats in E-UTRAN, U.S. Appl. No. 61/006,348 (provisional applications are not published).
Agenda item: 7.4, Source: QUALCOMM Europe, Title: Scheduling request mechanism, Document for: Discussion and Decision, 3GPP TSG-RAN WG1 #48bis, Mar. 26-30, 2007, St. Julian, Malta, R1-071276.
Source: Texas Instruments, Title: Scheduling Request and DRX in E-UTRA, Agenda Item: 7.13.2, Document for: Discussion, decision, 3GPP TSG RAN WG1 #49bis, Orlando, USA, Jun. 25-29, 2007, R1-072859.
Change Request, CR-Form-v9.3, 36.300 CR 0004, rev 1, Current version: 8.1.0, 3GPP TSG-RAN2 Meeting #59, Athens, Greece, Jun. 20-24, 2007, R2-073863.
Agenda Item: 5.2.2, Source: Ericsson, Title: SDU Discard, Document for: Discussion, decision, 3GPP TSG-RAN WG2 #59, Athens, Greece, Aug. 20-24, 2007, R2-073230.
Agenda Item: 5.1.1.2, Source: Motorola, Title: MAC Header format, Document for: Discussion/Decision, 3GPP TSG-RAN2 Meeting #59bis, Shanghai, P.R. China, Oct. 8-12, 2007, R2-074419.
Agenda Item: 5.1.1.2, Source: NTT DoCoMo, Inc., NEC, Title: MAC PDU structure for LTE, Document for: Discussion and Decision, 3GPP TSG RAN WG2 #59bis, Oct. 8-12, 2007, Shanghai, China, R2-074174.

3GPP TS 36.321 V1.0.0 (Sep. 2007), Technical Specification, "$3^{rd}$ Generation Partnership Project; Technical Specification Group radio Access Network; Evolved Universal Terrestrial Radio Access (E-UTRA) Medium Access Control (MAC) protocol specification (Release 8)".
Source: Chairman, Date: Oct. 12, Object: LTE User Plane session report, 3GPP TSG RAN WG2 #59bis, Oct. 8-12, 2008, Shanghai, China, R2-074536.
3GPP TS 25.321 V7.5.0 (Jun. 2007), Technical Specification, "$3^{rd}$ Generation Partnership Project; Technical Specification Group Radio Access Network; Medium Access Control (MAC) protocol specification (Release 7)".
"Universal Mobile Telecommunications System (UMTS); Radio Link Control (RLC) protocol specification (3GPP TS 25.322 version 4.10.0 Release 4); ETSI TS 125 322", ETSI Standards, LIS, Sophia Antipolis Cedex, France, vol. 3-R2, No. V4.10.0, Sep. 1, 2003, XP014016803.
LG Electronics Inc: "Correction to Polling Procedure", 3GPP Draft; R2-081588 Correction to Polling Procedure, $3^{rd}$ Generation Partnership Project (3GPP), Mobile Competence Centre; 650, Route Des Lucioles; F-06921 Sophia-Anti Polis Cedex; France, Vol. RAN WG2, no. Shenzhen, China; 20080324, Mar. 24, 2008, XP050139320.
Ghosh et al. "Random Access Design for UMTS Air-Interface Evolution", Apr. 2007, IEEE.
3GPP TS 36.322, V8.0.0, Dec. 2007, $3^{rd}$ Generation Partnership Project; Technical Specification Group Radio Access Network; Evolved Universal Terrestrial Radio Access (E-UTRA) Radio Link Control (RLC) protocol specification (Release 8).
Change Request, Miscellaneous corrections to TS 36.322, 3GPP TSG-RAN2 Meeting #61, Shenzhen, China, Mar. 31-Apr. 4, 2008, R2-081700.
Ericsson: "Clarification to the handling of large RLC status reports", Change Request, 3GPP TSG-RAN2 Meeting #61bis, Shenzhen, China, Mar. 31-Apr. 4, 2008, R2-082018.
LG Electronics et al. "ACK_SN setting for short Status PDU", 3GPP TSG-RAN WG2 #62, May 5-9, 2008, Kansas City, Missouri, R2-082133.
ITRI, "Buffer Status Reporting with Group Combining for LTE", 3GPP TSG RAN WG2, meeting #58bis, Orlando, Florida, Jun. 25-29, 2007, R2-072833.
NEC, "Consideration on Scheduling Information", 3GPP TSG RAN WG2 #59, Athens, Greece, Aug. 20-24, 2007, R2-073556.
ASUSTeK, "On-line recovery of HFN synchronization due to RLC UM SN problem", 3GPP TSG-RAN WG2 meeting #44, Sophia-Antipolis, France, Oct. 4-8, 2004, R2-041940.
Rapporteur (ASUSTeK), "Summary of HFN de-synchronization problem off-line email discussion", 3GPP TSG RAN WG2 #46, Scottsdale, Arizona, Feb. 14-18, 2005, R2-050318.
Jiang, ASUSteK Computer Inc, "HFN de-synchronization detection with Integrity Protection scheme in a wireless communications", U.S. Appl. No. 60/863,800.
Ericsson, "RLC status report format", TSG-RAN WG2 Meeting #60, Jeju Island, Korea, Nov. 5-9, 2007, R2-074701.
"LTE User Plane Session Report", 3GPP TSG RAN WG2 #59bis, Oct. 8-12, 2008, Shanghai, China, R2-074536.
$3^{rd}$ Generation Partnership Project, "Technical Specification Group Radio Access Network; Medium Access Control (MAC) protocol specification", Release 7, 3GPP TS 25.321, V7.5.0, Jun. 2007.
$3^{rd}$ Generation Partnership Project, "Technical Specification Group Radio Access Network; Evolved Universal Terrestrial Radio Access (E-UTRA) protocol specification", Release 8, 3GPP TS 36.321, V71.0.0, Sep. 2007.
LG Electronics, "Update of eUtran PDCP specification", 3GPP TSG-RAN2, Meeting #61, Sorrento, Italy, 2008, R2-081390.
Catt, "Notification scheme for system information change", 3GPP TSG-RAN WG2, #58. May 7-11, 2007, Kobe, Japan, R2-071870.
LG Electronics, "discussion on BCCH Update", 3GPP TSG-RAN WG2, #58is, Jun. 25-29, 2007, Orlando, FL, R2-072736.
NTT DoCoMo, Inc., "Uplink synchronization maintenance", 3GPP TSG RAN WG2 #58, May 7-11, 2007, Kobe, Japan, R2-072014.

(56) References Cited

OTHER PUBLICATIONS

Motorola, "Design of backoff scheme for LTE", 3GPP TSG-RAN-WG2 Meeting #56 bis, Sorrento, Italy, Jan. 15-19, 2007, R2-070143.

Alcatel-Lucent, "Format for RACH Message 2", 3GPP TSG RAN WG2 #60bis, Sevilla, Spain, Jan. 14-18, 2008, R2-080176.

"MAC Rapporteurs," Change Request: E-UTRA MAC protocol specification update, 3GPP TSG RAN WG2 #60bis, Sevilla, Spain, Jan. 14-18, 2008, R2-080631.

Qualcomm Europe, General Corrections to RLC, R2-011701, 3GPP, Jul. 3, 2001.

LG Electronics Inc, Out-of-sequence problem in AM RLC: Discretely discarded SDUs, R2-011206, 3GPP, May 25, 2001.

$3^{rd}$ Generation Partnership Project; Technical Specification Group Radio Access Network; Evolved Universal Terrestrial Radio Access (E-UTRA) Medium Access Control (MAC) protocol specification (Release 8); 3GPP TS 36.321 v8.2.0 (May 2008).

R2-095152, 3GPP TSG-RAN WG2 Meeting #67, "Minor Correctons to 36.321", Shenzhen, China, Aug. 24-28, 2009.

3GPP; XP-002520880, "$3^{rd}$ Generation Partnership Project; Technical Specification Group Radio Access Network; Evolved Universal Terrestrial Radio Access (E-UTRA) Medium Access Control (MAC) protocol specification (Release 8)"; 3GPP TS 36.321 V8.0.0 (Dec. 1, 2007).

Romain Mason: "E-UTRA RACII within the LTE system", Thesis submitted in fulfillment of the requirements for the award of the degree Masters of Engineering Research from the University of Lausanne, School of Electrical, Computer and Telecommunications Engineering, CH, Feb. 3, 2006, pp. 1-82, XP002448009, Stockholm, Sweden.

LG Electronics Inc.: "R2-073043 RACH procedure", 3GPP TSG-RAN WG2 #59, Athens, Greece, No. R2-073043 Aug. 19, 2007, pp. 1-3, XP-002515770.

3GPP; R2-080189 LTE RA BO RO, $3^{rd}$ Generation Partnership Project (3GGP); "Discussion on random access back-off procedure", 3GGP TSG-RAN W2 #60bis, Sevilla, Spain, Jan. 14, 2008).

"3rd Generation Partnership Project;Technical Specification Group Radio Access Network;Radio Link Control (RLC) protocol specification(Release 6)", 3GPP Draft; 25322-650, 3rd Generation Partnership Project (3GPP), Mobile Competence Centre; vol. RAN WG2, no. Cannes France; 20051017, Oct. 17, 2005, XP050129441.

Qinqing Zhang et al: "Performance of UMTS radio link control", Proceedings of IEEE International Conference on Communications—Apr.28-May 2002-New York, NY, USA, IEEE, Piscataway, NJ, USA, vol. 5, Apr. 28, 2002, pp. 3346-3350, XP010590089, DOI:10.1109/ICC.2002.997451 ISBN: 978-0-7803-7400-3 p. 3346, p. 3348.

3rd Generation Partnership Project; Technical Specification Group Radio Access Network; Radio Link Control (RLC) protocol specification (Release 7), Jun. 2007, V7.3.0, 3GPP Organizational Partners, France. XP050367795.

3GPP TS 36.322 V8.0.0, 3rd Generation Partnership Project; Technical Specification Group Radio Access Network; Evolved Universal Terrestrial Radio Access (E-UTRA) Radio Link Control (RLC) protocol Specification, (Dec. 20, 2007).

Qualcomm Europe, L2 Improvements and Polling, 3GPP TSG-RAN WG2 Meeting #58 R2-072021, May 11, 2007, p1-p3, URL: http://www.3gpp.org/ftp/tsg_ran/WG2_RL2/TSGR2_58/Documents/R2-072021.zip.

LG Electronics Cannes, France, Jun. 27-30, 2006, Delivery of LTE System Information, 3GPP TSG-RAN WG2 ad-hoc on LTE, R2-061959.

\* cited by examiner

R/R/E/LCID/F/L sub-header with
7-bits L field

R/R/E/LCID/F/L sub-header with
15-bits L field

R/R/E/LCID sub-header (a) Complete Fit (b) One octet remains (a) Same as Fig.7(b)   (b) One octet less for last MAC SDU (a)   (b)

(a)   (b)   (c)

LCID/E/R/R sub-header      LCID/E/R/R sub-header (a) Complete Fit      (b) One octet remains (a) Complete Fit      (b)

EFFECTIVE DATA BLOCK TRANSMISSION METHOD USING HEADER INDICATOR

This application is a 35 U.S.C. §371 National Stage entry of International Application No. PCT/KR2008/005497, filed on Sep. 18, 2008, and claims priority to U.S. Provisional Patent Application No. 60/973,442, filed Sep. 18, 2007, U.S. Provisional Patent Application No. 60/982,710, filed Oct. 25, 2007, and Korean Application No. 10-2008-0091287, filed on Sep. 17, 2008, each of which is hereby incorporated by reference in its entirety as if fully set forth herein.

TECHNICAL FIELD

The present invention relates to a radio (wireless) communication system providing a radio communication service and a terminal, and more particularly, to a method of exchanging a data block or data unit between a base station and a terminal in an Evolved Universal Mobile Telecommunications System (E-UMTS) that has evolved from a Universal Mobile Telecommunications System (UMTS) or a Long Term Evolution (LTE) system, which can generate a data block to enhance efficiency of radio resources.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN is generally comprised of a terminal (i.e., User Equipment (UE)), a base station (i.e., eNode B), a serving gateway (S-GW) that is located at an end of the E-UMTS network and connects with one or more external networks, and a Mobility Management Entity (MME) that performs mobility management functions for a mobile terminal. One eNode B may have one or more cells.

FIG. 2 shows an exemplary architecture of a radio interface protocol between a terminal and an E-UTRAN according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

Hereinafter, descriptions of particular layers of the radio protocol control plane of FIG. 2 and of the radio protocol user plane of FIG. 3 will be given in detail.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

Next, description of a Medium Access Control (MAC) Protocol Data Unit (PDU) used in a MAC entity will be given in more detail. FIG. 4 shows a general Protocol Data Unit (PDU) format used in a MAC entity. Referring to FIG. 4, the Logical Channel ID (LCID) field identifies a logical channel instance of a corresponding MAC SDU, and the Length (L) field indicates a length of the corresponding MAC SDU in bytes. The Extension (E) field indicates whether or not more fields are present in the MAC header. As shown in FIG. 5, in a process of generating the MAC PDU, if a size of the corresponding MAC SDU or MAC Control Element is less than or equal to 127, 7-bits L field is used. If not, a MAC sub-header including 15-bits L field is used. And, a MAC sub-header as shown in FIG. 6 is used for a MAC sub-header of the MAC SDU included in the MAC PDU or a fixed size MAC Control Element.

Next, descriptions of each field used in FIGS. 4, 5 and 6 will be given in more detail. First, the LCID field indicates the type of logical channel data of the corresponding MAC SDU or the type of data contained in the corresponding MAC Control Element (MAC CE). The E field indicates whether or not another MAC sub-header is subsequent to the current MAC sub-header. The Format (F) field indicates a length of the subsequent L field. The Reserved (R) field denotes a reserved bit and is an unused bit.

In general, a base station notifies a size of MAC PDU to a terminal via the PDCCH, which is a control channel of the physical layer, each time the MAC PDU is transmitted. That is, since the size of the MAC PDU transmitted via the PDCCH is known, there is no need to include any information indicating the overall size of the MAC PDU in the MAC PDU.

However, there is a limit in an amount of information transmitted via the PDCCH. That is, a size of the MAC PDU among the information transmitted via the PDCCH, i.e., the number of bits of information indicating a size of a Transport Block (TB) is limited. For instance, if a maximum size of the MAC PDU is set to 2000 bytes, 11 bit is needed to indicate the size of the MAC PDU in 1-byte unit. In this case, if the number of bits actually being used is 6, the size of the MAC PDU would be represented in 32-byte unit.

Meanwhile, an upper layer, specifically, the RLC generates MAC SDU for transmission into a size requested by the MAC entity. However, due to a small amount of data actually being stored in the RLC, if MAC SDU of a smaller size than that requested by the MAC is generated, the MAC entity generates MAC PDU by adding a padding bit thereto.

However, the related art may have the following problems.

FIG. 7 shows exemplary structure of related art MAC PDU. Referring to FIG. 7, it is assumed that a size of the MAC PDU, i.e., a size of the Transport Block (TB) is N+M+1 octet. In the related art, a MAC sub-header without having the L field is used for the last MAC SDU. Here, the presence of 1 octet would be ambiguous depending on the size of the last MAC SDU.

For instance, in FIGS. 7(a) and 7(b), it is assumed that RLC PDU 1 through RLC PDU N−1 are the same in size, and the last RLC PDU (i.e., RLC PDU N) in FIG. 7(b) has a smaller size by 1, as compared to that in FIG. 7(a). In FIG. 7(b), it is assumed that a total size of MAC sub-headers and associated MAC SDU (RLC PDU) or MAC Control Element and a size of the transport block are the same. Here, if the size of the RLC PDU N is reduced by 1, it means 1 byte space is generated in the MAC PDU. If the transmitting side MAC entity does not indicate an existence of 1 byte padding in the last of the MAC PDU, the receiving side MAC entity would not be able to distinguish the two cases as shown in FIGS. 7(a) and 7(b) from each other. In addition, the receiving side MAC entity would decode the two cases to the same RLC PDUs.

In addition, if an additional header is added to indicate the existence of padding in the last of the MAC PDU in FIG. 7, a problem shown in FIG. 8 would occur. That is, in FIG. 7(b), in order to include a MAC sub-header for padding, a MAC sub-header being included right before the MAC sub-header should include the L field. This assumes, as shown in FIG. 8(b), that the size of the RLC PDU N (i.e., the MAC SDU being included in the last) should be reduced. Further, padding is not needed in this case. That is, according to the related art, if there is 1-byte or 2-byte space in the MAC PDU, a problem in generating the MAC PDU would occur.

DISCLOSURE OF INVENTION

Technical Solution

Therefore, an object of the present invention is to provide a method of effectively indicating padding data existing in MAC PDU when a base station and a terminal generate and transmit the MAC PDU. More specifically, the present invention is to provide a method of effectively handling 1-byte or 2-byte space when there is the 1-byte or 2-byte space in the MAC PDU.

To achieve these and other advantages and in accordance with the purpose of the present invention, as embodied and broadly described herein, there is provided a method of generating a protocol data unit (PDU) in wireless communication system, including: receiving at least one service data unit (SDU) from an upper layer; adding a header to the at least one received SDU to generate the protocol data unit; determining whether single byte or two byte padding is required to complete the generation of the protocol data unit; and inserting at least one padding indicator into the protocol data unit in order to indicate the single or two byte padding if the single byte or two byte padding is determined to be required.

Mode for the Invention

One aspect of the present invention is the recognition by the present inventors regarding the problems and drawbacks of the related art described above and explained in more detail hereafter. Based upon such recognition, the features of the present invention have been developed.

The present invention is applied to a 3GPP communication technique, in particular, a Universal Mobile Telecommunications system, communication apparatus and communication method. However, without being limited to this, the present invention can be applied to all the wired/wireless communications to which the technical features of the present invention are applicable.

The present invention is to provide a method of effectively indicating padding data existing in MAC PDU when a base station and a terminal generate and transmit the MAC PDU. For this, the present invention proposes to use a padding indicator. More specifically, the padding indicator indicates a size of padding data, that is, how many padding bytes are included in the MAC PDU. Here, if any padding data is present in the MAC PDU, a transmitting-side MAC entity includes a field, called a "Padding Extension (PE)" field into the MAC PDU. Here, the PE field is included in the last header of the MAC PDU. The PE field indicates whether or not the right next field is another PE field or whether the PE field itself is the last PE field included in the MAC PDU. In addition, a value obtained by subtracting 1 from the number of the PE fields included in the MAC PDU by using the PE field may be padding bytes included in the MAC PDU. Among the PE fields included in the MAC PDU, padding according to the number of the PE field in which the next field is set to be the PE field may be included in the MAC PDU.

Hereinafter, description of structures and operations of the preferred embodiments according to the present invention will be given with reference to the accompanying drawings.

Figure 1:
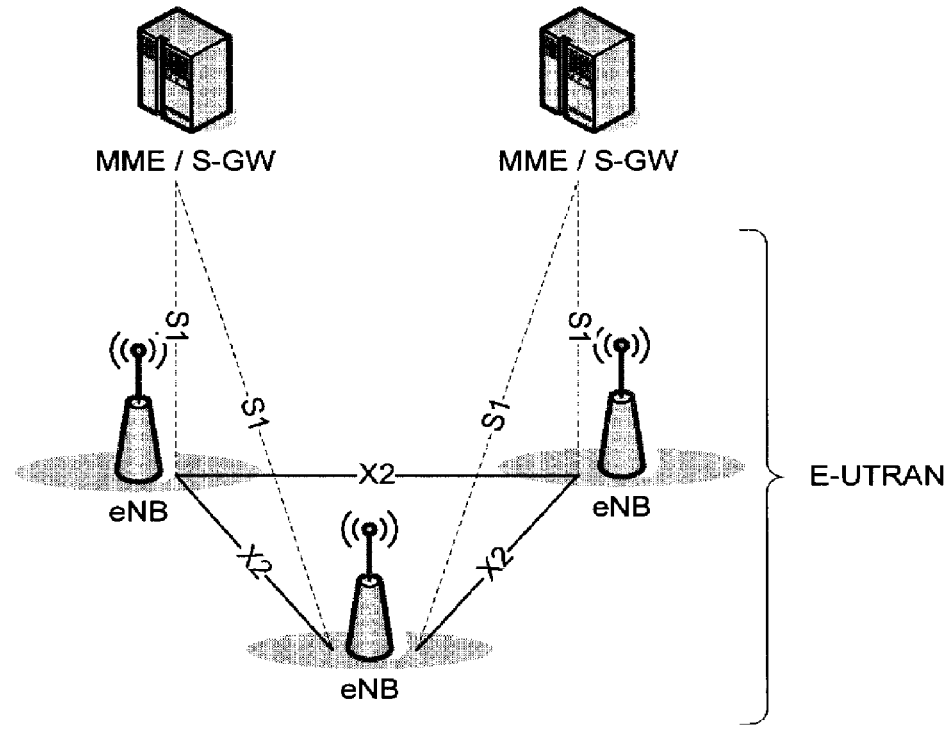
FIG. 1 shows an exemplary network structure of an Evolved Universal Terrestrial Radio Access Network (E-UTRAN) as a mobile communication system to which a related art and the present invention are applied.
Figure 2:
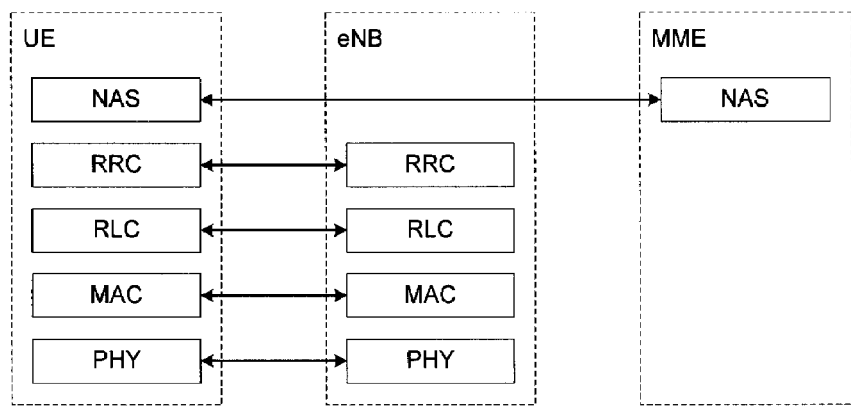
FIG. 2 is an exemplary view of related art control plane architecture of a radio interface protocol between a terminal and an E-UTRAN.
Figure 3:
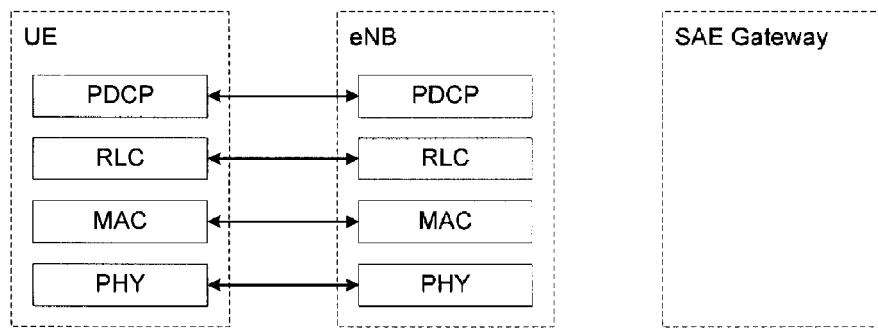
FIG. 3 is an exemplary view of related art user plane architecture of a radio interface protocol between a terminal and an E-UTRAN.
Figure 4:
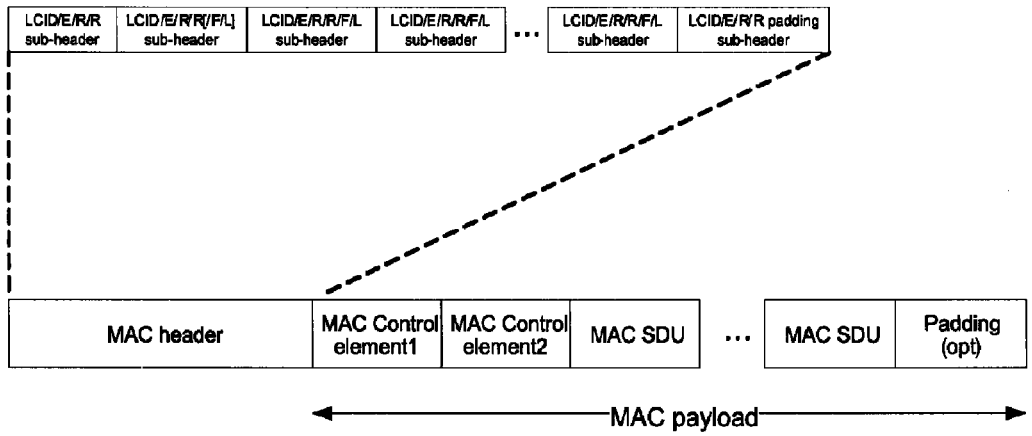
FIG. 4 shows an exemplary Protocol Data Unit (PDU) format used in a Medium Access Control (MAC) entity.
Figure 5:
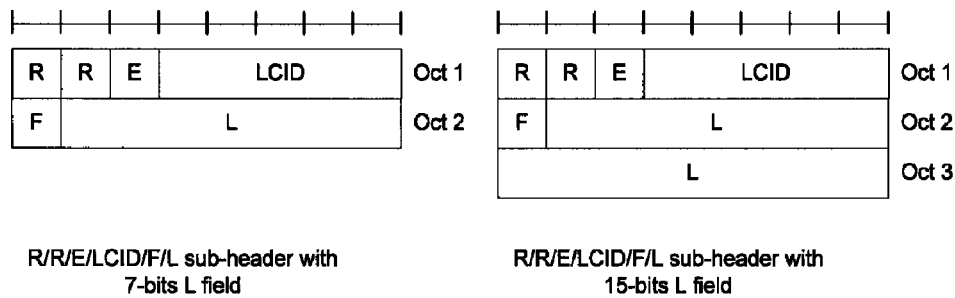
FIG. 5 shows an exemplary MAC sub-header format used in a Medium Access Control (MAC) entity.
Figure 6:
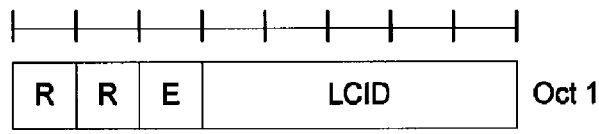
FIG. 6 shows another exemplary MAC sub-header format used in the MAC entity.
Figure 7:
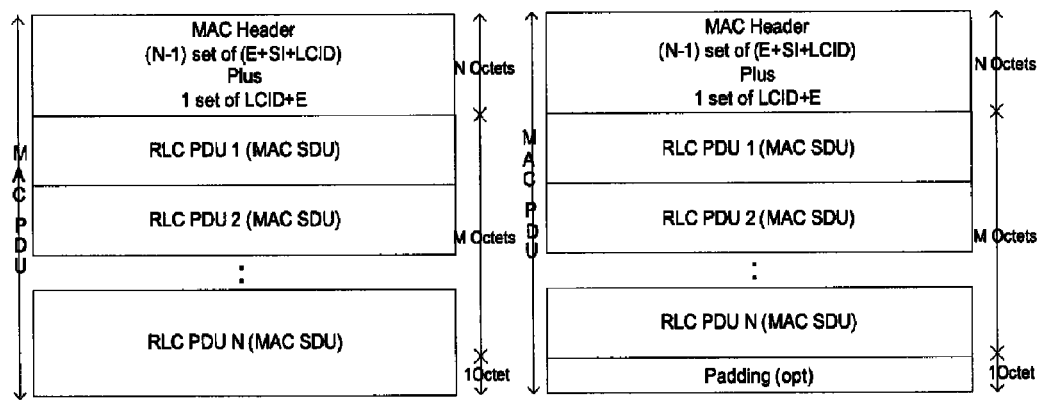
FIGS. 7(a) and 7(b) show exemplary structure of related art MAC PDU.
Figure 8:
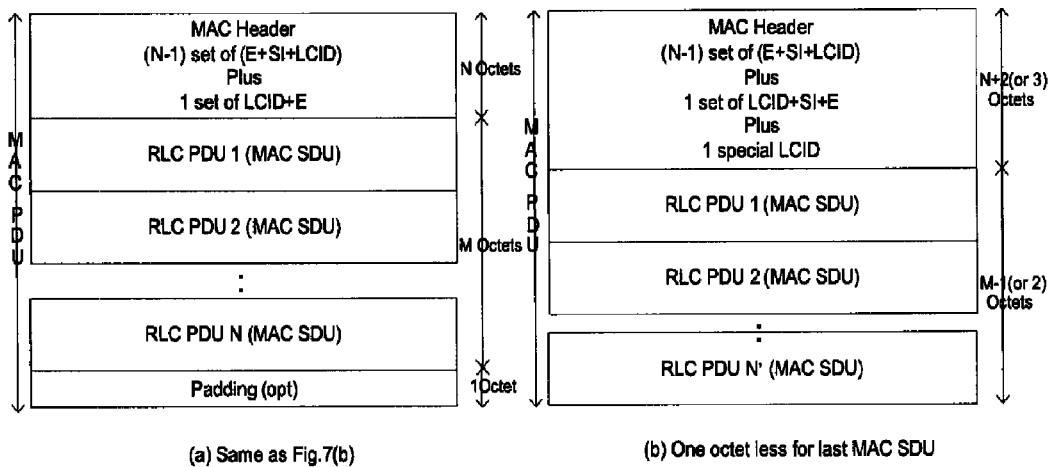
FIGS. 8(a) and 8(b) show another exemplary structure of related art MAC PDU.
Figure 9:
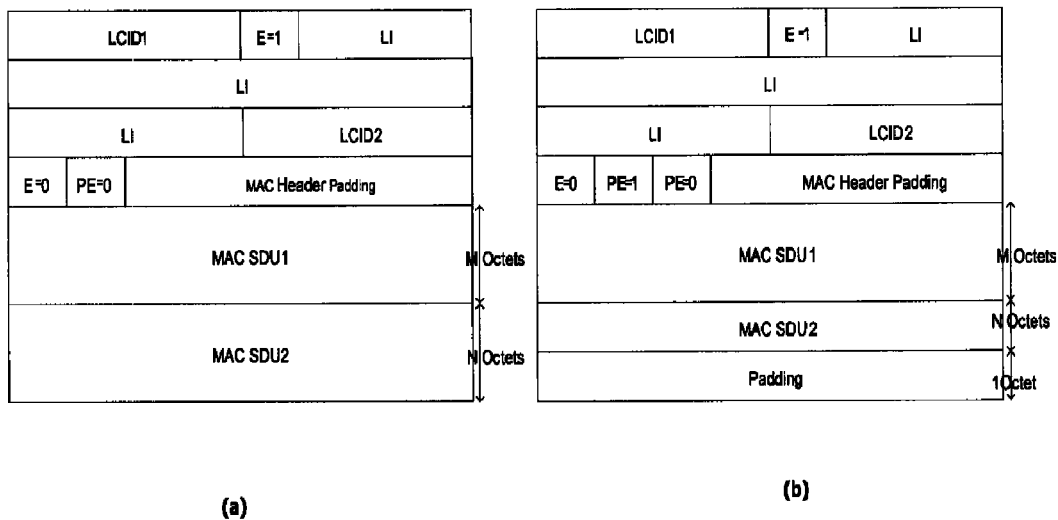
FIG. 9 shows a method of generating a MAC PDU according to a first embodiment of the present invention.

FIG. 9 shows a method of generating a MAC PDU according to a first embodiment of the present invention. In FIG. 9, the R field of MAC sub-header is omitted. FIG. 9(a) is a case when padding is not included in the MAC PDU, and FIG. 9(b) is a case when 1-byte padding is included. In FIG. 9(a), a first PE field is set to 0, indicating that the next field is not the PE field, and accordingly, the padding byte is not included in the MAC PDU. Conversely, in FIG. 9(b), a first PE field is set to 1, indicating that the next field is the PE field. And, a second PE field is set to 0, indicating that the second PE field is the last PE field of the MAC PDU, to thusly indicate that a third PE field is not included in the MAC PDU. Therefore, 1-byte padding exists in the MAC PDU in FIG. 9(b).

During such process, the MAC header padding used for byte alignment of the MAC header is not considered as the padding. In addition, during the above process, if a total size of the MAC sub-header and a total size of a MAC Service Data Unit (SDU) or MAC Control Element (CE) indicated by the MAC sub-header are equal to a size of the Transport Block (TB), the PE field may not be included.

The present invention proposes another method of effectively indicating the existence of padding. In particular, in the process of MAC PDU generation, it is proposed to use a padding LCID in most cases and to use a 2-bit padding indicator in consideration of a problem occurring when the padding byte is 0 or 1 or 2 bytes. That is, the last field of the MAC PDU header is set using a 2-bit Padding Indicator (PI) and indicates a padding byte being actually included.

Figure 10:
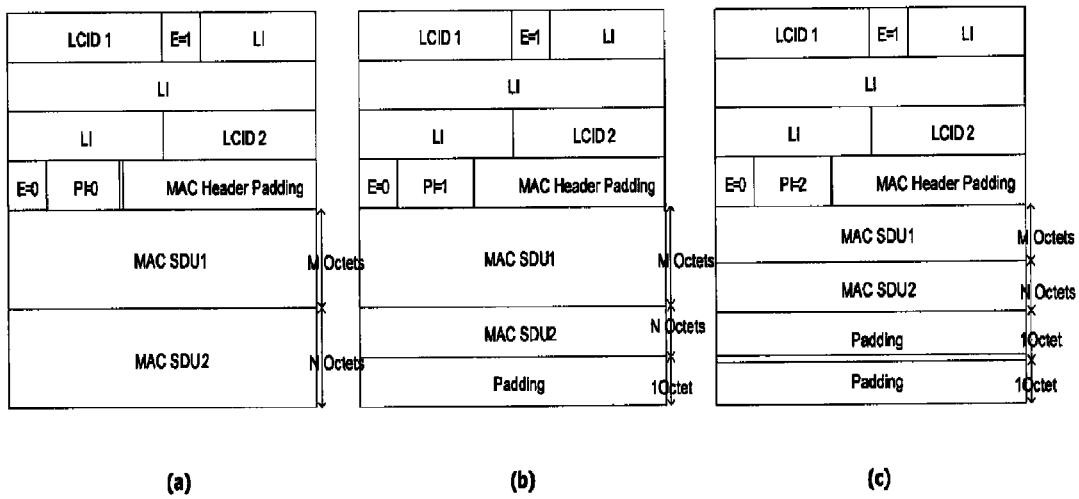
FIG. 10 shows a method of generating a MAC PDU according to a second embodiment of the present invention.

FIG. 10 shows a method of generating a MAC PDU according to a second embodiment of the present invention. Referring to FIG. 10, the PI is included as the last field of a MAC header, and a value of the PI indicates the number of padding bytes included in the last of the MAC PDU. In FIG. 10(a), if the PI is set to 0, 0 byte padding is present in the MAC PDU. In FIG. 10(b), if the PI is set to 1, 1 byte padding is present in the MAC PDU. In addition, in FIG. 10(c), if the PI is set to 2, 2 byte padding is present in the MAC PDU. Even though the 2-bit PI has been assumed in FIG. 10, 1-bit PI may also be used. In this case, the 1-bit PI may indicate whether or not the 1 byte padding exists or simply indicate whether or not the padding exists.

Figure 11:
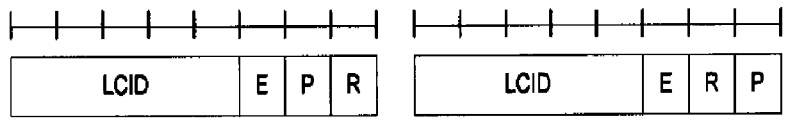
FIGS. 11 and 12 show a method of generating a MAC PDU according to a third embodiment of the present invention.
Figure 12:
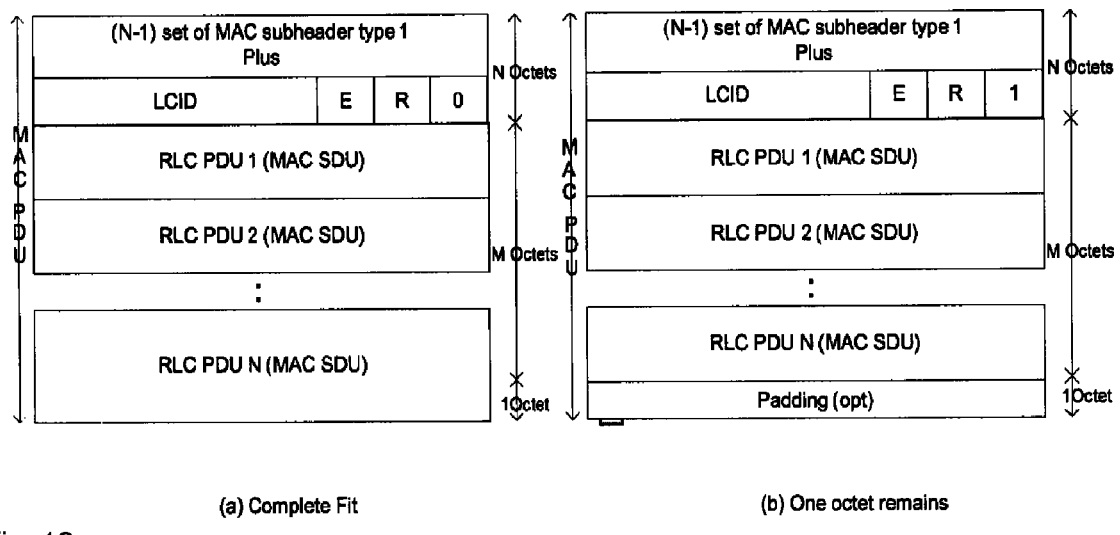

Another scheme according to the present invention will be described. Referring to FIGS. 11 and 12, one of the R fields existing in each MAC sub-header is used to indicate an existence of 1 byte padding in the last portion of the MAC PDU. In FIG. 11, the P field is a padding indicator bit, and the MAC sub-header is used only in the last MAC sub-header included in the MAC PDU.

FIG. 12 illustrates an exemplary structure of the MAC sub-header in FIG. 11. Preferably, in FIGS. 11 and 12, if a value of the last LCID field indicates padding, the P field is unused. In addition, the LCID used in the last sub-header may be a special LCID value indicating that padding existing in the MAC PDU is 1-byte.

Another scheme according to the present invention is to allocate another padding LCID, i.e., to define another padding LCID which is separate from the related art LCID for indicating padding. In this case, a first padding LCID is used when padding within the MAC PDU is less than 2 bytes, and another padding LCID is used when padding within the MAC PDU is greater than 2 bytes.

Figure 13:
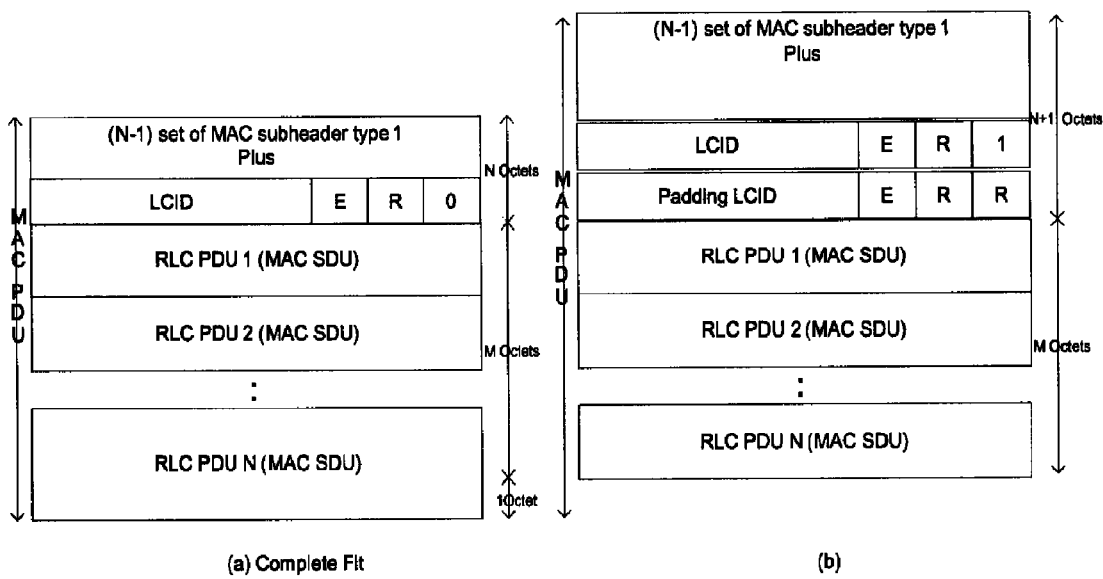
FIG. 13 shows a method of generating a MAC PDU according to a fourth embodiment of the present invention.

FIG. 13 shows a method of generating a MAC PDU according to the present invention. One of the R bits included in each MAC sub-header is used as a Padding Indicator Bit (PIB). Preferably, the padding indicator bit is included in MAC sub-header where the E field is set to 0, and is unused in MAC sub-header where the E field is not set to 0. Here, if the padding indicator bit is used, i.e., the E field is set to 0, the L field is not included, and the PIB field indicates whether or not the MAC sub-header having the padding LCID is present immediately after the MAC sub-header in which the padding indicator bit has been used.

That is, the E field indicates the presence of the L field in a certain MAC sub-header. In the related art, when the L field is not present in the last MAC sub-header, a problem occurred due to 1 byte remaining in the MAC PDU. In order to solve this problem, the present invention includes the padding indicator bit in the MAC sub-header where the E field is set to 0, and then includes another 1 byte-MAC sub-header in the MAC sub-header, thereby generating a complete MAC PDU by using 1 byte remaining in the MAC PDU. That is, instead of padding, the MAC sub-header having the padding LCID is included. The padding indicator bit indicates whether or not the next field or sub-header is a sub-header for indicating padding.

During the above process, an LCID value used to indicate when 1-byte padding only is present in the MAC PDU may be different from an LCID value used to indicate general padding. In addition, an LCID value used to indicate when 1-byte padding only is present in the MAC PDU may be the same as an LCID value used to indicate general padding. That is, the LCID set with a specific value is used to indicate 1-byte padding.

According to the present invention, a MAC PDU may consist of a MAC header, one or more MAC Service Data Units (MAC SDUs), one or more MAC Control elements, and optionally padding. Here, both the MAC header and the MAC SDUs are of variable sizes. The MAC PDU header may consists of one or more MAC PDU subheaders, and each sub-header corresponding to either the MAC SDU, the MAC control element or padding. The MAC PDU sub-header may consist of the six header fields R/R/E/LCID/F/L but for the last sub-header in the MAC PDU and for fixed sized MAC control elements. The last sub-header in the MAC PDU and sub-headers for fixed sized MAC control elements may consist solely of the four header fields R/R/E/LCID. It may follow that a MAC PDU sub-header corresponding to padding consists of the four header fields R/R/E/LCID. The MAC PDU sub-headers have the same order as the corresponding MAC SDUs, MAC control elements and padding. The MAC control elements, except padding BSR (buffer status report), are always placed before any MAC SDU. The padding BSR may occurs at the end of the MAC PDU. The padding may occurs at the end of the MAC PDU, except when single byte or two byte padding is required but can not be achieved by padding at the end of the MAC PDU. When single byte or two byte padding is required but can not be achieved by padding at the end of the MAC PDU, one or two MAC PDU sub-headers corresponding to padding are inserted before the first MAC PDU sub-header corresponding to a MAC SDU. If such sub-header is not present, one or two MAC PDU sub-headers corresponding to padding are inserted before the last MAC PDU sub-header corresponding to a MAC control element.

When the MAC entity generates the MAC PDU, the present invention has an effect of increasing efficiency of radio resources by informing actually useful or useless information with minimized overhead.

The present invention may provide a method of generating a protocol data unit (PDU) in wireless communication system, comprising: receiving at least one service data unit (SDU) from an upper layer; adding a header to the at least one received SDU to generate the protocol data unit; determining whether single byte or two byte padding is required to complete the generation of the protocol data unit; and inserting at least one padding indicator into the protocol data unit in order to indicate the single or two byte padding if the single byte or two byte padding is determined to be required, wherein the at least one padding indicator is inserted into a header of the protocol data unit, the header includes at least one of a LCID field to identify the upper layer and an L field to indicate the size of the received SDU, the at least one padding indicator is set with a special value in the LCID field, delivering the generated protocol data unit to a lower layer, the determining step is performed by comparing a total size of PDU requested by the lower layer with a total size of the received SDU together with the header, the header includes one or more sub-headers, the at least one padding indicator is inserted before a first sub-header corresponding to the service data unit, the at least one padding indicator is inserted before a last sub-header corresponding to a control element, the protocol data unit is a MAC (medium access control) PDU, the at least one padding indicator is used to indicate an existence of a padding byte, and the at least one padding indicator is used to indicate a size of a padding byte.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of generating a protocol data unit (PDU) in wireless communication system, comprising:

receiving at least one service data unit (SDU) from an upper layer to generate the protocol data unit;

determining whether single byte or two byte padding is required to complete the generation of the protocol data unit; and inserting at least one padding indicator into the protocol data unit in order to indicate the single or two byte padding if the single byte or two byte padding is determined to be required, wherein the at least one padding indicator is added into a header of the PDU, wherein the header includes at least Logical Channel Identifier (LCID) field to identify a logical channel of the received SDU and a Length (L) field to indicate a length of the received SDU in bytes, wherein the at least one padding indicator is set with a specific value in the LCID field, wherein the service data unit is a Medium Access Control (MAC) SDU, the protocol data unit is a Medium Access Control (MAC) PDU, and the header of the PDU is a MAC PDU header, wherein the MAC PDU header includes one or more MAC PDU sub-headers, and wherein one or two MAC PDU sub-headers corresponding to the single byte or two byte padding are inserted before a first MAC PDU sub-header corresponding to the MAC SDU when the single byte or two byte padding is required but cannot be achieved by padding at end of the MAC PDU.

2. The method of claim 1, further comprising: delivering the generated MAC PDU to a lower layer.

3. The method of claim 2, wherein the determining step is performed by comparing a total size of MAC PDU requested by the lower layer with a total size of the received MAC SDU together with the MAC PDU header.

4. The method of claim 1, wherein the at least one padding indicator is used to indicate an existence of a padding byte.

5. The method of claim 1, wherein the at least one padding indicator is used to indicate a size of a padding byte.

* * * * *